(12) United States Patent
Fleck et al.

(10) Patent No.: US 10,754,449 B2
(45) Date of Patent: Aug. 25, 2020

(54) BRISTLE BRUSH SENSORS

(71) Applicant: Wacom Co., Ltd., Kazo-shi, Saitama (JP)

(72) Inventors: David C. Fleck, Vancouver, WA (US); Sadao Yamamoto, Tokyo (JP)

(73) Assignee: Wacom Co., Ltd., Kazo-shi (JP)

( * ) Notice: Subject to any disclaimer, the term of this patent is extended or adjusted under 35 U.S.C. 154(b) by 0 days.

(21) Appl. No.: 16/000,610

(22) Filed: Jun. 5, 2018

(65) Prior Publication Data

US 2019/0369753 A1  Dec. 5, 2019

(51) Int. Cl.
| | |
|---|---|
| *G06F 3/0354* | (2013.01) |
| *F21V 8/00* | (2006.01) |
| *G06F 3/0488* | (2013.01) |
| *G06F 3/038* | (2013.01) |
| *B44F 11/02* | (2006.01) |

(Continued)

(52) U.S. Cl.
CPC ......... *G06F 3/03545* (2013.01); *G02B 6/001* (2013.01); *G06F 3/0383* (2013.01); *B44F 11/02* (2013.01); *G06F 3/044* (2013.01); *G06F 3/047* (2013.01); *G06F 3/04883* (2013.01)

(58) Field of Classification Search
CPC ........ B44F 11/02; B44F 11/00; G06F 3/0338; G06F 3/03545; G06F 3/044; G06F 3/047; G06F 3/0481; G06F 3/04812; G06F 3/042; G06F 3/041; G06F 3/0354; G06F 3/0334; G06F 3/033; G06F 3/0386; G06F 3/0383; G06F 3/038; G06F 3/03542; G06F 3/0304; G06F 3/03; G06F 3/01; G06F 3/00; G06F 3/045; G06F 3/0488; G02B 6/00; G02B 6/001
See application file for complete search history.

(56) References Cited

U.S. PATENT DOCUMENTS

| | | | |
|---|---|---|---|
| 5,679,930 A | 10/1997 | Katsurahira | |
| 8,749,572 B2 * | 6/2014 | DiVerdi | G06T 11/001 345/592 |

(Continued)

FOREIGN PATENT DOCUMENTS

EP    2194447 A1 *  6/2010  ........... G06F 3/0412

OTHER PUBLICATIONS

Vandoren et al, "IntuPaint: Bridging the Gap between Physical and Digital Painting", 2008 IEEE International Workshop on Horizontal Interactive Human Computer System (TABLETOP), pp. 65-72. (Year: 2008).*

(Continued)

*Primary Examiner* — Julie Anne Watko
(74) *Attorney, Agent, or Firm* — Christensen O'Connor Johnson Kindness PLLC

(57) ABSTRACT

A stylus brush for creating paintbrush-like digital effects using a digitizer. The stylus brush includes sensing filaments. The sensing filaments include a conductor extending the length of the filament, wherein the conductor transmits light or current along the length of the filament; a cladding or insulator juxtaposed against the conductor; and a means for changing a light or electrical property passing through the conductor when the filament bends along the length as compared to the light or electrical property of the filament in a nonbent condition, wherein the filament has a width not more than 1 mm and length not more than 10 cm.

8 Claims, 10 Drawing Sheets

(51) Int. Cl.
*G06F 3/044* (2006.01)
*G06F 3/047* (2006.01)

(56) References Cited

U.S. PATENT DOCUMENTS

| | | | | |
|---|---|---|---|---|
| 8,952,939 | B2* | 2/2015 | Lee | B44F 11/02 |
| | | | | 345/179 |
| 9,026,933 | B2* | 5/2015 | Kano | G06F 3/04883 |
| | | | | 345/156 |
| 9,329,703 | B2* | 5/2016 | Falkenburg | G06F 3/03545 |
| 9,600,096 | B2 | 3/2017 | Katsurahira et al. | |
| 2003/0117408 | A1* | 6/2003 | Forsline | G06F 3/03545 |
| | | | | 345/581 |
| 2006/0084039 | A1* | 4/2006 | Ryokai | B44D 3/00 |
| | | | | 434/155 |
| 2013/0135262 | A1* | 5/2013 | Alameh | G06F 3/0383 |
| | | | | 345/179 |
| 2013/0193532 | A1* | 8/2013 | Horie | H01L 29/84 |
| | | | | 257/415 |
| 2014/0078109 | A1* | 3/2014 | Armstrong-Muntner | |
| | | | | G06F 3/03545 |
| | | | | 345/175 |
| 2014/0098058 | A1* | 4/2014 | Baharav | G06F 3/0421 |
| | | | | 345/174 |
| 2018/0046268 | A1* | 2/2018 | Keidar | G06F 3/0383 |
| 2018/0088689 | A1* | 3/2018 | Frenock | G06F 3/03545 |
| 2019/0025949 | A1* | 1/2019 | Parikh | G06F 3/03545 |

OTHER PUBLICATIONS

Sekiya et al, "iNkDraw: Physical Ink-Based Interface for Capturing and Manipulating Drawings on Digital Display", TEI'11, Jan. 22-26, 2011, Funchal, Portugal, pp. 45-48. (Year: 2011).*

* cited by examiner

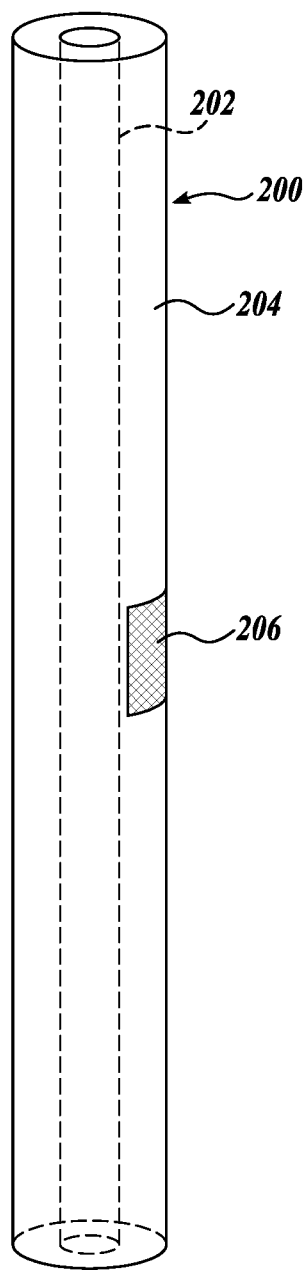
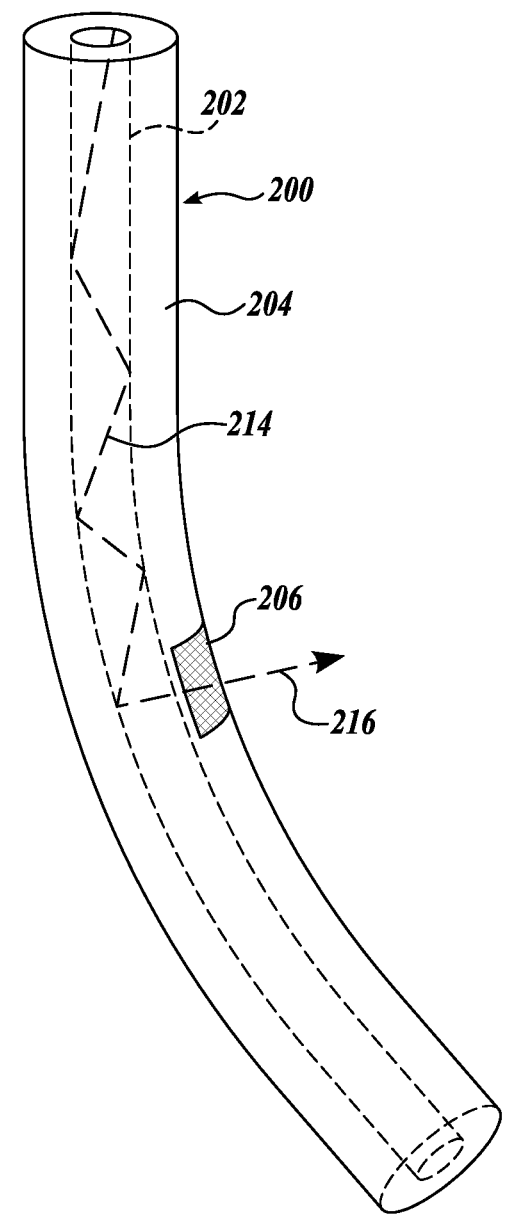
FIG. 2  FIG. 3

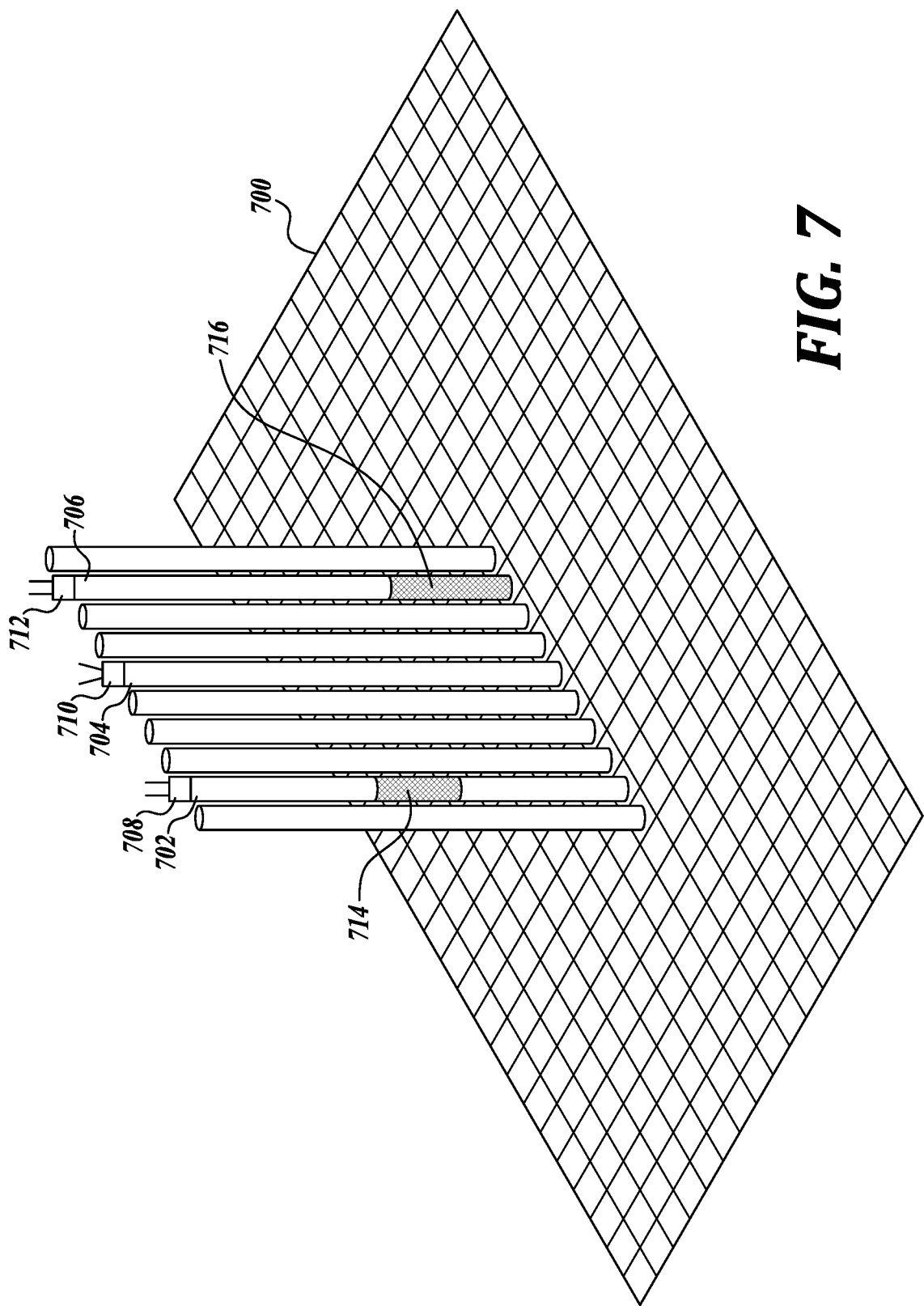

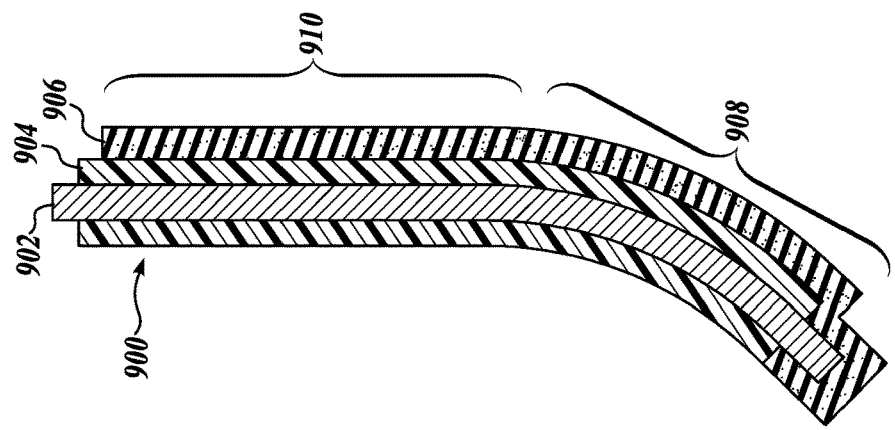
*FIG. 10*
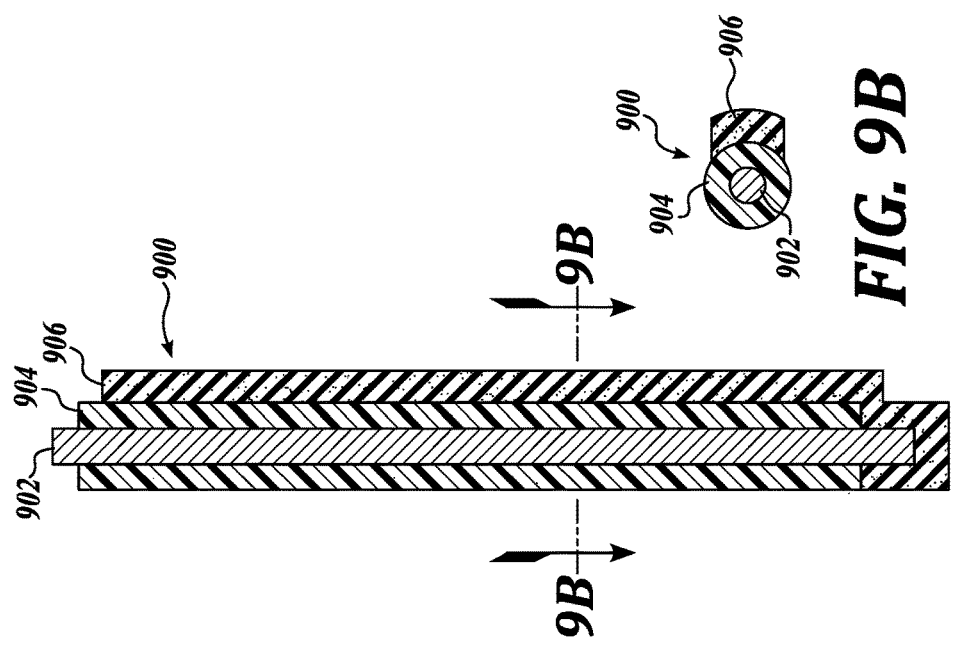
*FIG. 9A*  *FIG. 9B*
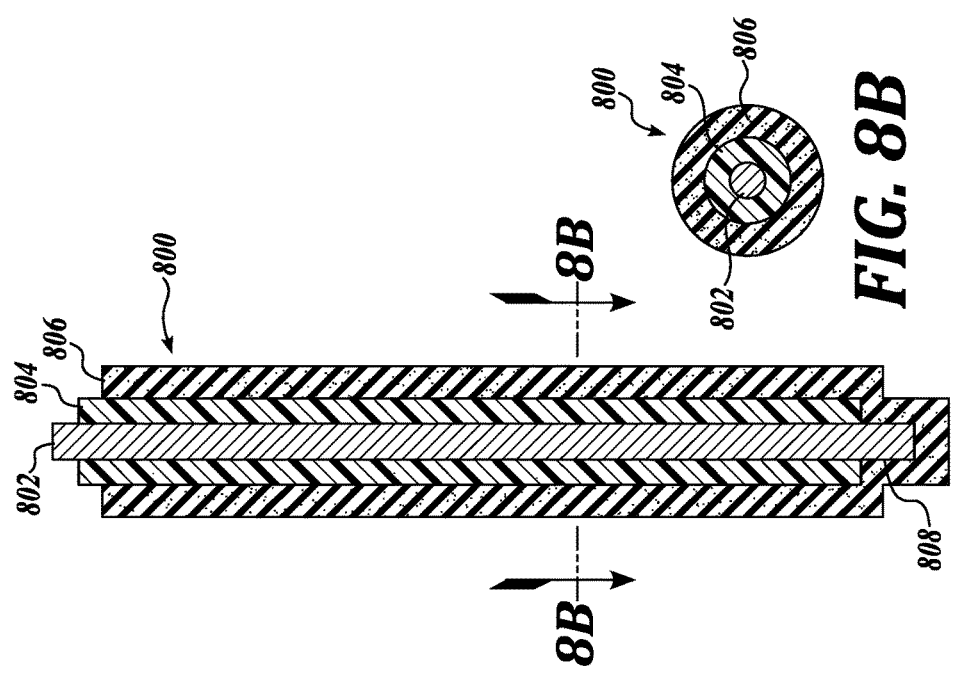
*FIG. 8A*  *FIG. 8B*

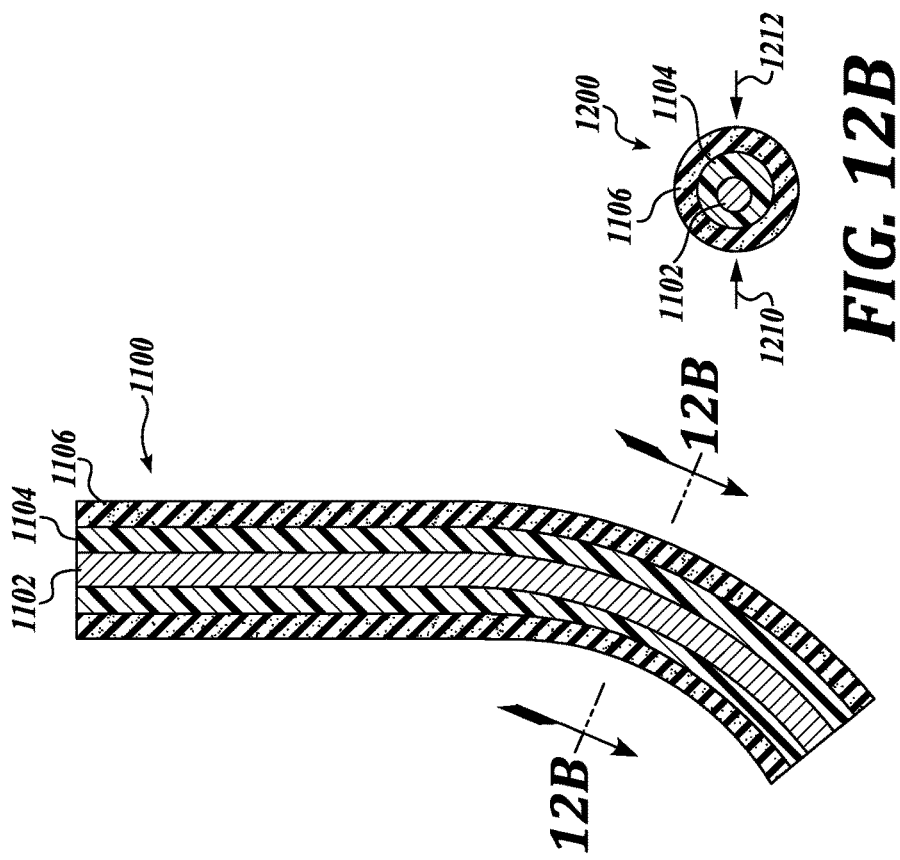
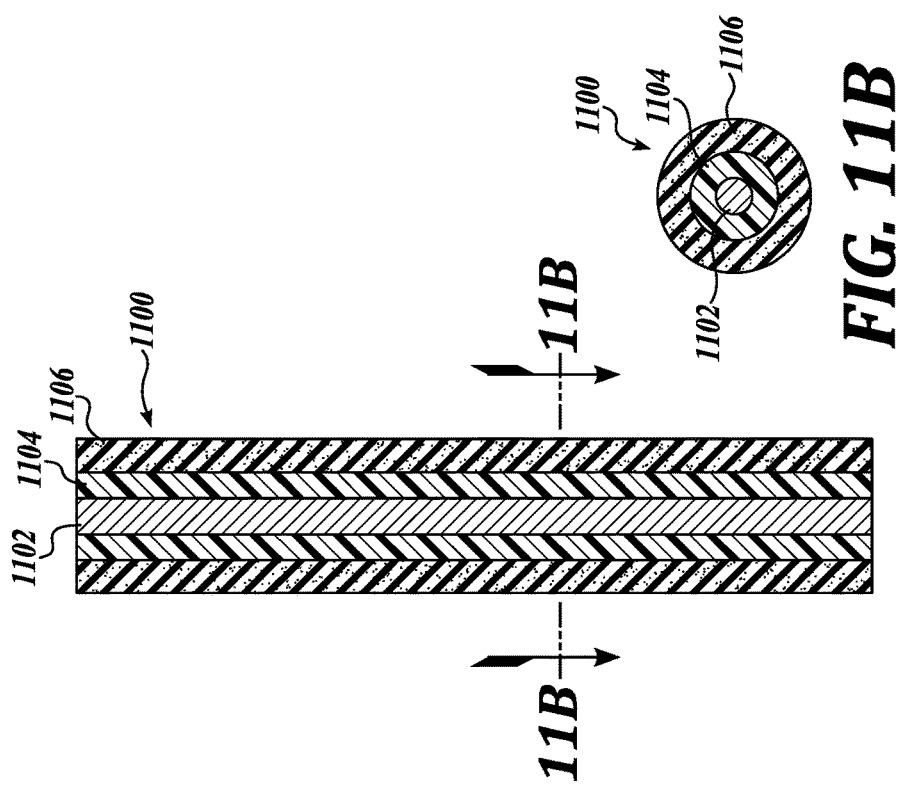
FIG. 11A
FIG. 11B
FIG. 12A
FIG. 12B

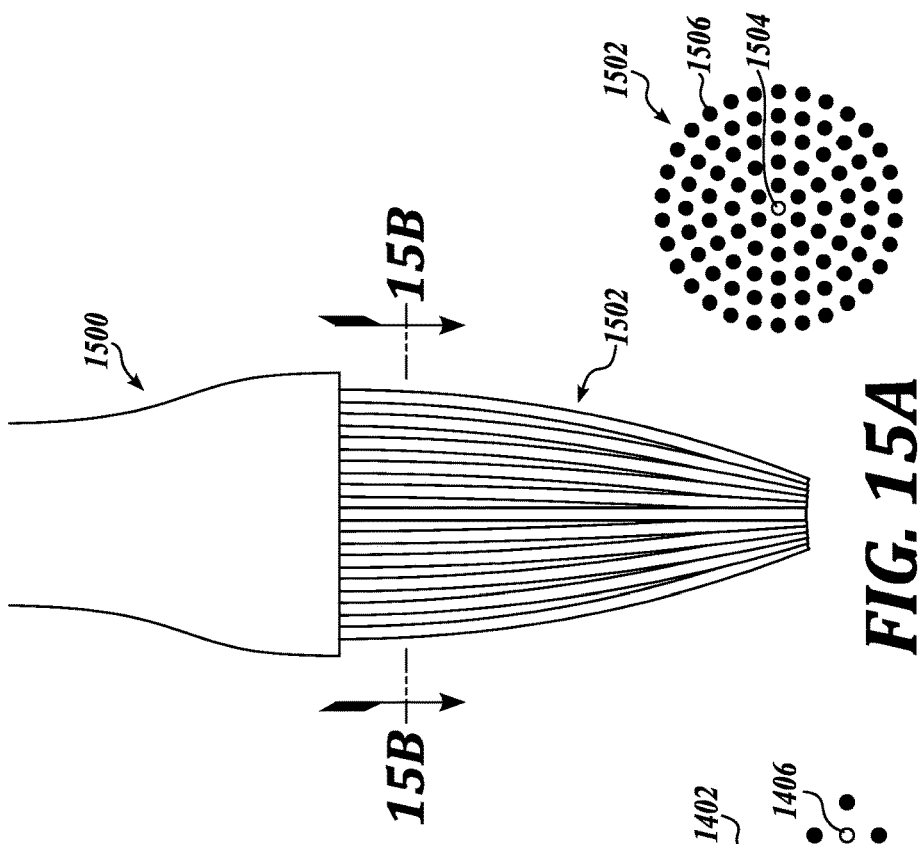
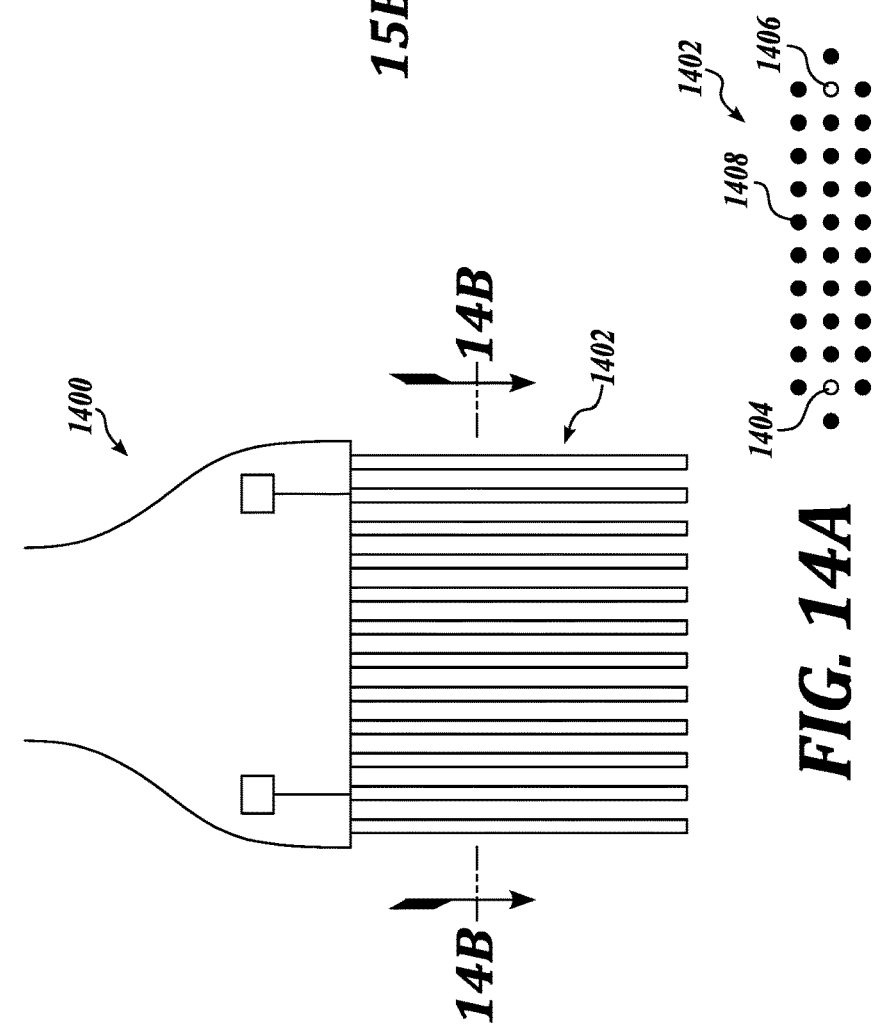

BRISTLE BRUSH SENSORS

BACKGROUND

Graphic artists working in a digital medium generally have a choice to use a tablet or a pen display for creating drawings. Generally, a tablet will have to be connected to a display. With a tablet, the artist puts a stylus pen to the tablet surface, but the drawing appears on the separate display not the tablet. With a pen display, the artist puts the stylus pen to the display surface, and the artist is able to view the drawing on the same surface as it is being created with the stylus pen. Both tablets and pen displays have a digitizer that converts a physical input from the stylus pen into electronic signals which are then translated into images corresponding to the physical input. The most common type of input device for a digitizer of tablets and pen displays is a stylus pen.

A stylus pen is basically a writing instrument but made to work with electronic devices to create digital images. There are various technologies that can transfer the contact pressure of writing with a stylus pen into a digital image. Such technologies can rely on resistive, capacitive, optical, magnetostrictive, acoustic, mechanical, inertial, or electro-magnetic properties to name some. Complex signal processing software along with very fast processors can create remarkably detailed images with the input provided by a stylus pen. However, while stylus pens are highly functional in creating line art, there has been little advancement of recreating digital painting analogous to using paintbrushes. Partly, the slower advancement of digital brush painting may be due to the more complex movement of the brush bristles that have to be modeled. Each brush bristle may have a different touch angle and contact pressure. Even considering the complex signal processing and effects that can be created digitally, the stylus pen is unable to exactly recreate the effects of a paintbrush on a digital medium.

SUMMARY

In order to properly model paintbrush effects digitally, the present disclosure recognizes that paintbrush filaments differ from a stylus pen in that brush filaments bend on contact. According to the present disclosure, the amount and direction of brush filament bending can be important in properly recreating paintbrush effects digitally. Therefore, the present disclosure provides bending sensors capable of detecting the amount and direction of bending. Further, the bending sensors of this disclosure have physical dimensions so that the sensors can be bodily incorporated into the stylus brush as one or more brush filaments. The stylus brush can be used on tablets or pen displays with digitizers for creating digital artwork, for example. A bending sensor in the form of a filament provides a physical input, i.e., the direction and amount of filament bending that is not possible with a stylus pen. Thus, a stylus brush with bending sensors as filaments provides additional signals that may be translated into any number of possible effects to give a more accurate portrayal of brush painting in a digital medium.

In one embodiment, a filament for a stylus brush, comprises: a transmission core extending the length of the filament, wherein the transmission core transmits light or current along the length of the filament; a cladding or insulator juxtaposed against the transmission core; and a means for changing a light or electrical property passing through the transmission core when the filament bends along the length as compared to the light or electrical property of the filament in a nonbent condition, wherein the filament has a width not more than 1 mm and length not more than 10 cm.

In one embodiment, the transmission core is an optical fiber having a conductor of light and the cladding or insulator providing total internal reflection, wherein the means comprises at least one area where the cladding or insulator is absent along the length of the filament which causes loss of reflection of light.

In one embodiment, the means comprises cladding being absent at a distal end of the filament.

In one embodiment, the means comprises cladding being absent between the proximal and distal ends of the filament.

In one embodiment, the means encompasses a segment less than the entire circumference of the filament.

In one embodiment, the filament comprises an electrical circuit having a metal conductor, wherein the means comprises a variable resistive conductive material separated from the metal conductor for a majority of the length of the filament by an electrical insulator except at a tip of the filament where the metal conductor contacts the variable resistive conductive material.

In one embodiment, the variable resistive conductive material is provided around a circumference of the filament and for a length of the filament.

In one embodiment, the variable resistive conductive material is provided as a strip along a side of the filament.

In one embodiment, the transmission core is a metal conductor, wherein the means comprises a second conductor separated from the metal conductor for a length of the filament by an electrical insulator, wherein the insulator has a degree of compression.

In one embodiment, the second conductor is a coil wound around the insulator.

In one embodiment, the second conductor is provided as a strip along a side of the filament.

In one embodiment, a stylus brush for creating images on a workstation surface, comprises: a plurality of brush filaments arranged into a brush head at an end of the stylus brush, and at least one of the plurality of brush filaments is a filament sensor comprising: a transmission core extending the length of the filament, wherein the transmission core transmits light or current along the length of the filament; a cladding or insulator juxtaposed against the transmission core; and a means for changing a light or electrical property passing through the transmission core when the filament bends along the length as compared to the light or electrical property of the filament in a nonbent condition.

In one embodiment, the stylus brush comprises a flat brush head, and at least two filament sensors, wherein each of the filament sensors is placed at an end of the brush head length.

In one embodiment, the stylus brush comprises a round brush head, and at least one filament sensor is placed at about the center of the brush head length and width.

In one embodiment, the stylus brush comprises one or more directional filament sensors placed at a particular angular placement depending on the direction desired to be sensed.

In one embodiment, the directional filament sensors comprise a means provided as a strip along a side of the filament.

In one embodiment, a method of sensing bending of filaments of a stylus brush, comprises: providing at least one filament sensor in a brush head, the filament including: a transmission core extending the length of the filament, wherein the transmission core transmits light or current along the length of the filament; a cladding or insulator juxtaposed against the transmission core; and a means for changing a light or electrical property passing through the transmission core when the filament bends along the length as compared to the light or electrical property of the filament in a nonbent condition, wherein the filament has a width not more than 1 mm and length not more than 10 cm.

In one embodiment, the transmission core is an optical fiber having a conductor of light and the cladding or insulator providing total internal reflection, wherein the means comprises at least one area where the cladding or insulator is absent along the length of the filament which causes loss of reflection of light, the method further comprising: sensing the bending of filaments of the stylus brush based on the loss of reflection of light.

In one embodiment, the method further comprises: sensing the bending of filaments of the stylus based on a difference in light at the base of the filament and a tip of the filament.

In one embodiment, the transmission core is an metal conductor, the filament comprises an electrical circuit wherein the means comprises a variable resistive conductive material separated from the metal conductor for a majority of the length of the filament by an electrical insulator except at a tip of the filament where the metal conductor contacts the variable resistive conductive material, the method further comprising: sensing a difference in resistance across the electrical circuit when bending the filament compared to a resistance when the filament is in a nonbent condition.

In one embodiment, the transmission core is a metal conductor, wherein the means comprises a second conductor separated from the metal conductor for a length of the filament by an electrical insulator, wherein the insulator has a degree of compression, the method further comprising: sensing a difference in the capacitance of the electrical circuit when bending the filament compared to a capacitance when the filament is in a nonbent condition.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a diagrammatical illustration of an embodiment of an optical brush filament for sensing bending;

FIG. 3 is a diagrammatical illustration showing the loss of light through the optical brush filament of FIG. 2;

FIG. 7 is a diagrammatical illustration showing an embodiment for the detection of loss of light using an optical brush filament;

FIG. 8A is a diagrammatical illustration of an embodiment of a resistive brush filament for sensing bending;

FIG. 8B is a cross-sectional illustration of the resistive brush filament of FIG. 8A;

FIG. 9A is a diagrammatical illustration of an embodiment of a resistive brush filament for sensing bending;

FIG. 9B is a cross-sectional illustration of the resistive brush filament of FIG. 9A;

FIG. 10 is a diagrammatical illustration showing an embodiment for the detection of bending using a resistive brush filament;

FIG. 11A is a diagrammatical illustration of an embodiment of a capacitive brush filament for sensing bending;

FIG. 11B is a cross-sectional illustration of the capacitive brush filament of FIG. 11A;

FIG. 12A is a diagrammatical illustration showing an embodiment for the detection of bending using a capacitive brush filament;

FIG. 12B is a cross-sectional illustration of the capacitive brush filament of FIG. 12A;

FIG. 14A is a diagrammatical illustration of a flat stylus brush head incorporating one or more filaments for sending bending;

FIG. 14B is a cross-sectional illustration of the brush head of FIG. 14A;

FIG. 15A is a diagrammatical illustration of a round (or Sumi) stylus brush head incorporating one or more filaments for sending bending;

FIG. 15B is a cross-sectional illustration of the brush head of FIG. 15A;

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. Any illustrative examples provided herein are not intended to be exhaustive or to limit the claimed subject matter to the precise forms disclosed.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
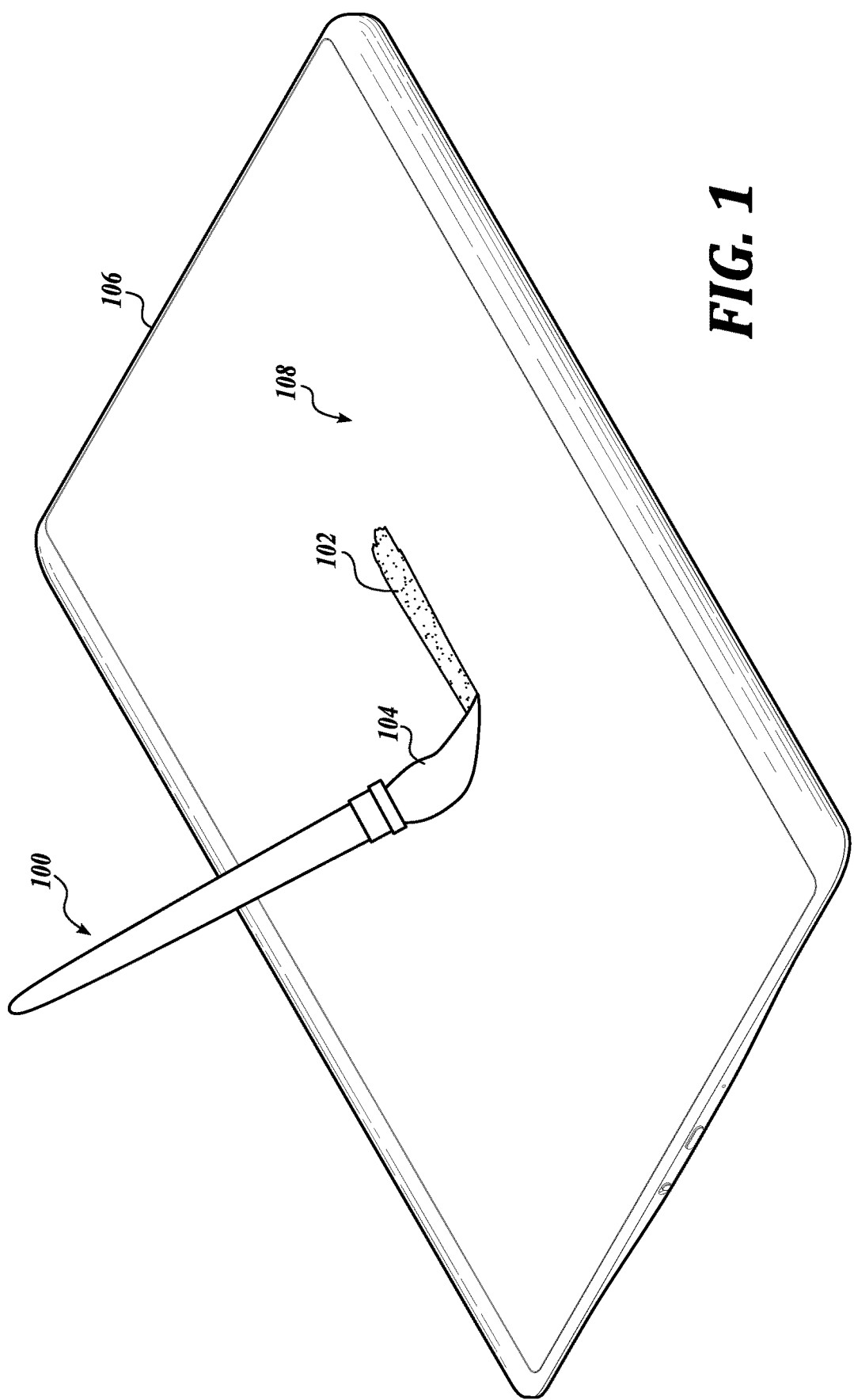
FIG. 1 is a diagrammatical illustration showing the environment of a stylus brush having one or more bending sensors for creating digital brush painting effects.

FIG. 1 is a diagrammatical illustration showing an environment for use of a stylus brush 100 having filaments that sense bending in accordance with the present disclosure.

Particularly, FIG. 1 shows a pen display 106 with a digitizer and display surface 108 that converts the contact pressure of the brush head 104 filaments into a digitally created paint effect 102. The brush head 104 includes one or more bending sensors used as filaments in the brush head 104 that contribute to the creation of the digital paint effect 102. While the device 106 is shown as a pen display, because it has a display as well as a digitizer, the device 106 can also be a tablet without a display or any other device that has a digitizer that recognizes the contact pressure of the stylus brush 100 and converts the physical input into electric signals to create a digital image either on the same tablet or on a different device. Pen displays are also sometimes referred to as "writing tablets" or "writing pads." This disclosure encompasses all devices having at least a digitizer for converting the contact pressure of the brush 100 into electric signals converted into an image. Reference may be made to the Applicant's U.S. Pat. Nos. 5,679,930 and 9,600,096, both incorporated herein expressly by reference. The present disclosure relates to bending sensors capable of being used as brush filaments and the stylus brushes used with digitizers.

FIG. 2 is an embodiment of an optical brush filament 200 for sensing bending. The optical brush filament 200 includes a transmission core 202 extending the length of the filament 200, wherein the transmission core 202 transmits light along the length of the filament 200; a cladding or insulator 204 is juxtaposed against the transmission core 202; and a means 206 for changing a light property passing through the transmission core 202 when the filament 200 bends along the length as compared to the light property of the filament 200 in a nonbent condition. The filament 200 is dimensioned to be of similar dimensions to conventional brush filaments, so as to be bodily incorporated with conventional brush filaments into a brush head. For example, the filament 200 can have a width not more than 1 mm and length not more than 10 cm. In the optical brush filament of FIG. 2, the optical property being changed by the means 206 is the total internal reflection or the loss of light.

Particularly, the optical brush filament 200 has a transmission core 202 surrounded by an annular cladding 204. The transmission core 202 is for the transmission of light along the length of the filament 200. The cladding 204 is for reflecting the light back into the transmission core 202. Generally, the optical brush filament 200 works as an optical fiber, which transmits light through the transmission core 202 through the property known as "total internal reflection." The optical brush filament 200 includes at least the two layers of the transmission core 202 and the cladding 204. However, the optical brush filament 200 may also include additional layers surrounding the cladding 204. An additional layer surrounding the cladding 204 may include a strengthening layer, such as a KEVLAR fiber layer. An even further layer forming the exterior of the optical brush filament 200 may be a layer of material similar to all other brush filaments. For example, the exterior layer of the optical brush filament 200 can be NYLON or POLYESTER, which are common materials for synthetic brush filaments.

As seen in FIG. 3, the light 214 passing through the transmission core 202 has the property of "total internal reflection" due to reflection of light at the interface between the transmission core 202 and the cladding 204. However, at the means 206 for changing the total internal reflection of light, the cladding 204 is absent and some of the light 216 is not reflected back to the core conductor 202 from the means 206. Thus, there is a loss or reduction in the amount of light reaching the opposite end of the optical brush filament 200.

In an embodiment, the transmission core 202 and the cladding 204 are made from glass. In an embodiment, to achieve total internal reflection, the cladding 202 has a lower refractive index than the transmission core 202. The transmission core 202 can be a high purity glass and have a diameter as small as about 9 to 10 microns to 100 microns. Alternatively, the transmission core 202 can be made from a polymer, such as polymethylmethacrylate or polystyrene. The lower refractive index of polymers as compared to glass may be tolerated because the distances of light transmission are not very great. The cladding 204 can have an outer diameter of about 50 microns to about 200 microns. Materials known for use in optic fibers can be used in the present embodiment. Since the optical brush filament 200 is to be used with other conventional brush filaments, the overall diameter and the length of the optical brush filament can be similarly dimensioned regardless of the number of layers in the optical brush filament 200.

In an embodiment, the means 206 for changing a property of the light 214, i.e., the total internal reflection, comprises at least one area where the cladding 204 is absent along the length of the filament 200. The area 206 of missing cladding 204 can be the entire circumference or part way around the circumference of the cladding 204. Also, the length of the area 206 of missing cladding 204 can extend any amount of length of the filament 200. The amount of area 206 of missing cladding 204 with regards to the length and circumference can depend on how much light is desired to be lost. An optical brush filament can also have more than one means 206 for changing the light property along the length of the filament 200.

In the case where the means 206 of the optical brush filament 200 encompasses a segment less than the entire circumference of the filament 200, such brush filament 200 can sense direction of bending more readily. When assembling a brush head with filaments 200 of FIG. 2, the filament 200 can be oriented with a particular angular placement of the means 206 in the brush head to sense the direction desired to be sensed, for example.

In another embodiment, the means 206 is a material different than the cladding 204. Such different material can have a refractive index that allows the angle of incidence of reflected light within the core conductor 202 to have an angle of incidence that is smaller than the critical angle of incidence and thus light is able to pass through the means 206.

FIG. 3 is an illustration of the optical brush filament 200 of FIG. 2 in a bent condition. Light 214 is shown entering the transmission core 202 and being reflected at the interface of the transmission core 202 and cladding 204. The light 214 will continue to be totally internally reflected along the length of the filament 200 until the light strikes the means 206 or area which is missing the cladding 204. Some light 216 escapes at the means 206 resulting in a reduction of the overall amount of light that is transmitted from one end of the optical brush filament 200 to the opposite end. The difference in the amount of light can be measured and this difference can represent a bending characteristic, such as the amount of bending and the direction of bending or both. In FIG. 3, light is shown entering the transmission core 202 through the base or proximal end which would be connected to the brush handle. However, in another embodiment, the light 214 can also enter the transmission core 202 through the distal end.

Figure 4:
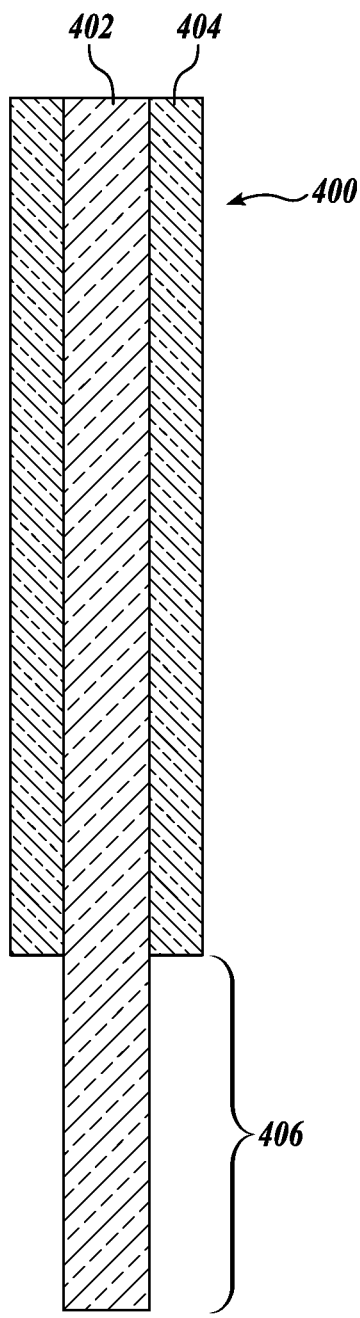
FIG. 4 is a diagrammatical illustration of an embodiment of an optical brush filament for sensing bending.

FIG. 4 is an illustration of another embodiment of an optical brush filament 400. Similar to the optical brush filament 200 of FIGS. 2 and 3, the optical brush filament 400 of FIG. 4 includes a transmission core 402 that transmits light and a cladding 404 that reflects the light so as to provide total internal reflection. The materials and sizes for the transmission core 402 and cladding 404 can be similar to the optical brush filament 200. The optical brush filament 400 of FIG. 4 is for illustrating that the means 406 for changing the light property can be provided at the distal end of the filament 400 (the end opposite to the handle). Placement of the means 406 for changing the optical property at the distal end of the filament 400 can be for sensing bending at the tip of the filament 400, for example, when used in a round or Sumi stylus brush. See FIG. 15. The means 406 can extend around the entire circumference of the transmission core 402, as illustrated. Alternatively, the means 406 can extend only for part of the circumference.

Figure 5:
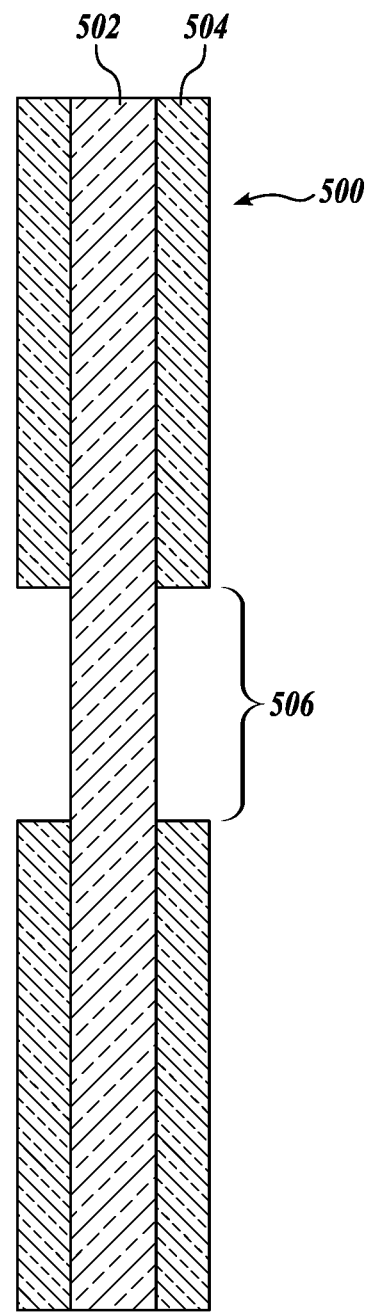
FIG. 5 is a diagrammatical illustration of an embodiment of an optical brush filament for sensing bending.

FIG. 5 is an illustration of another embodiment of an optical brush filament 500. Similar to the optical brush filament 200 of FIGS. 2 and 3, the optical brush filament 500 of FIG. 5 includes a transmission core 502 that transmits light and a cladding 504 that reflects the light so as to provide total internal reflection. The materials and sizes for the transmission core 502 and cladding 504 can be similar to the optical brush filament 200. The optical brush filament 500 of FIG. 5 is for illustrating that the means 506 for changing the light property can be provided at the middle or anywhere between the distal and proximal ends of the filament 500. Placement of the means 406 for changing the optical property at the middle of the filament 500 can be for sensing bending of the filament body, for example, when used in a flat stylus brush. See FIG. 14A. The means 506 can extend around the entire circumference of the transmission core 502, as illustrated. Alternatively, the means 506 can extend only for part of the circumference.

Figure 6:
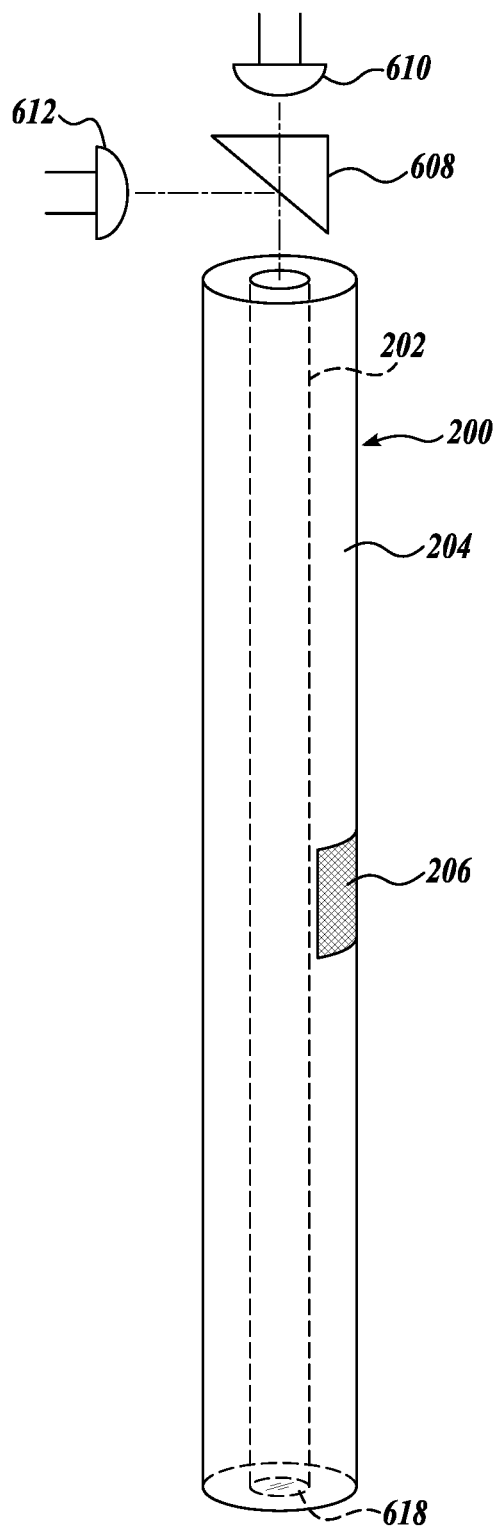
FIG. 6 is a diagrammatical illustration showing an embodiment for the detection of loss of light using an optical brush filament.

As described above, the means 206, 406, and 506 which have missing cladding or different refractive index lead to a greater loss of light when the optical brush filaments 200, 400, and 500 are in a bent condition as compared to the nonbent condition so that a measurement of the loss of light can convey information of the bending characteristics of the optical brush filaments 200, 400, and 500. FIG. 6 shows one embodiment of sensing the loss of such light via any of the optical brush filaments 200, 400, and 500. For sensing bending through the loss of light with an optical brush filament, an illumination source and a light sensor are used. FIG. 6 shows the optical brush filament 200 of FIG. 2, however, the optical brush filaments 400 and 500 can also be used. Further, the optical brush filament 200 of FIG. 2 has a modification to include a reflective material 618 at the distal end of the transmission core 202.

In the embodiment of FIG. 6, the illumination source can be a light-emitting diode (LED) positioned over the proximal end of the optical brush filament 200. The LED 610 can be included in the brush handle where the base of the optical brush filaments are joined to the handle via a ferrule. The light emitted by the LED 610 then passes into the transmission core 202. The light entering the transmission core 202 can be sensed or determined. As described above, the light being transmitted through the transmission core 202 will experience a greater loss due to the means 206 when the fiber is in the bent condition as compared to the nonbent condition. In FIG. 6, the light that does not escape via means 206 is reflected at the end of the transmission core 202 via the reflective material 618 and then travels in the opposite direction, which will again experience more loss as the light has to cross the means 206 in the opposite direction. The returned light that exits the proximal end of the optical brush filament 200 is reflected by a beam splitter 208 and measured by sensor 612, which can be any conventional sensor such as a charge-coupled device (CCD). The light that has been transmitted twice the length of the optical brush filament 200 can be compared to light emitted by the LED 210 or the light determined to enter the transmission core 202 initially, and the difference will represent a bending characteristic that can be used in modeling brush painting digital effects. Possible LEDs that can be used in this embodiment include, but are not limited to, Model Nano-Point-0201 SMD LED from SunLED. The dimensions of such LED are 0.65 mm×0.35 mm, and a height of 0.20 mm. The embodiment of FIG. 6 can amplify the loss of light effect because light is lost in both directions.

Referring to FIG. 7, another embodiment of sensing the loss of light via an optical brush filament is illustrated. FIG. 7 shows optical brush filaments 702 and 706 which have means 714 and 716 for changing the total internal reflection property of the light, and an unmodified optical brush filament 704 that does not have a means for changing the total internal reflection property of light. Optical brush filament 704 will be used as a reference for sensing the illumination source. The modified optical brush filaments 702, 706 and the unmodified optical brush filament 704 are further incorporated with a plurality of conventional brush filaments so as to form a brush head. The optical brush filaments 702 and 706 can have any structure of the optical brush filaments 200, 400, and 500 previously described.

In the embodiment of FIG. 7 a liquid crystal display 700 (LCD) providing backlighting serves as the illumination source. LCD 700 has an array of pixels represented as the square grid. As is well known, the pixels in an LCD are turned on or off using liquid crystals to rotate polarized light. The pixels can provide continuous backlighting. Since the illumination source 700 provides light from the distal end of the optical brush filaments 702, 704, and 706, the mirror 618 shown in FIG. 6 is not used which allows the light to enter from the distal end of the optical brush filaments 702, 704, 706. The optical brush filaments 702, 704, and 706 have a light sensor 708, 710, and 712, respectively, at the proximal end. The light emitted by the pixels of the LCD 700 is transmitted through each of the optical brush filaments 702, 704, and 706. However, light will escape from the optical brush filaments 702 and 704 due to the missing cladding of means 714 and 716 in the bent condition as compared with the nonbent condition of the filaments. The light that is transmitted from the distal to the proximal end of the optical brush filaments 702, 704, and 706 is then measured by the sensors 708, 710, and 712. The difference between the light sensed by the unmodified optical brush filament 704 serving as a baseline compared to the light sensed by optical brush filaments 702 and 706 with means 714 and 716 will represent a characteristic of bending of the filaments 702 and 706 that can be used to create a paint brush digital effect.

FIGS. 8A and 8B show an embodiment of a resistive brush filament 800 for sensing bending. The resistive brush filament 800 includes a conductor 802 extending the length of the filament 800, wherein the conductor 802 transmits current along the length of the filament 800; an insulator 804 juxtaposed against the conductor 802; and a means 806 for changing an electrical property passing through the conductor 802 when the filament 800 bends along the length as compared to the electrical property of the filament 800 in a nonbent condition. The filament 800 is dimensioned to be of similar dimensions to conventional brush filaments, so as to be bodily incorporated with conventional brush filaments into a brush head. For example, the filament 800 can have a width not more than 1 mm and length not more than 10 cm. In the resistive brush filament 800 of FIG. 8A, the electrical property being changed by the means 806 is the electrical resistance through bending of the filament.

Particularly, the resistive brush filament 800 has a core conductor 802 made of a material low in electrical resistivity (high in conductivity), such as copper or other metals. The means 806 comprises a variable resistive conductive material separated from the core conductor 802 for a majority of the length of the filament 800 by the electrical insulation 804 except at a distal tip 808 of the filament 800 where the insulation 804 is missing so that the metal core conductor 802 contacts the variable resistive conductive material means 806.

Generally, the resistive brush filament 800 works as a simple closed electrical circuit. The core conductor 802 is for the transmission of current along the length of the filament 800. The insulation 804 is for electrically insulting a majority of the length of the core conductor 802 from the means 806. The proximal end of the core conductor 802 is attached to one terminal of an electrical load, such as a small direct current (DC) battery, while the other terminal of the electrical load is connected to the proximal end of the variable resistance conductive means 806. A sensor, such as an ohm meter (not shown) senses the resistance in the electrical circuit with a known current and voltage applied at the terminals.

While the resistive brush filament 800 includes at least the three layers of the core conductor 802, the insulation 804, and the variable resistance conductive material means 806; however, the resistive brush filament 800 may also include additional layers surrounding the variable resistance conductive means 806. An additional layer surrounding the means 806 may include a further exterior insulation layer and or a layer of material similar to all other brush filaments. For example, the exterior layer of the resistive brush filament can be NYLON or POLYESTER, which are common materials for synthetic brush filaments.

The variable resistance conductive material 806 is any material that experiences a change in its electrical resistance properties when strained or stressed. Representative materials include, but are not limited to, polymers such as polyvinyl chloride with a filler of conductive particles such as carbon microspheres. Other representative resins include, for example, epoxy resins, alkyd resins, phenol resins, polyurethane resins, and polyimide resins. Other representative conductive particles include, for example, metals and metal oxides. As the variable resistance conductive material 806 bends, the particles move further apart, or in some different materials, micro cracks appear, both of which causes the resistance to increase or decrease compared to the resistance of the material means 806 when the material means 806 is in the nonbent condition. The difference in electrical resistance between the filament 800 in the bent condition as compared to the nonbent condition is converted to represent a characteristic of bending of the filament 800 that can be used to create a paint brush digital effect.

FIGS. 9A and 9B show a resistive brush filament 900 that has the resistive conductive material means 906 as a strip of variable resistive conductive material on one side (a segment of the circumference) along the length of the filament 900 instead of the entire circumference as in the embodiment of FIGS. 8A and 8B. Otherwise, the materials of resistive brush filament 900 can be similar to the materials of the resistive brush filament 800. In the embodiment of FIGS. 9A and 9B, the resistive brush filament 900 can sense direction of bending by such placement of a strip of the resistive conductive material means 906 along the filament 900 from the proximal end to the distal end. When assembling a brush head with filaments 900 of FIGS. 9A and 9B, the filament 900 will be oriented with a particular angular placement of the strip of the resistive conductive material means 906 in the brush head to sense the direction desired to be sensed, for example.

FIG. 10 is an illustration of the resistive brush filament 900 in a bent condition. The resistive brush filament 900 has a bent portion 908 and a nonbent or slightly bent portion 910. As described above, the resistive conductive material means 906 can include microspheres or a powder of conductive particles. The more that the filament 900 bends, the further apart the conductive particles of the resistive conductive material means 906 separate and lead to an increase in the resistance to current flow. Stopped.

FIGS. 11A and 11B show an embodiment of a capacitive brush filament 1100 for sensing bending. The capacitive brush filament 1100 includes a conductor 1102 extending the length of the filament 1100, wherein the conductor 1102 transmits current along the length of the filament 1100; an insulator 1104 juxtaposed against the conductor 1102; and a conducting means 1106 for changing an electrical field passing through the insulator 1104 due to the distance decreasing between the conducting means 1106 and the conductor 1102 due to compression of the resilient insulator material 1104 when the filament 1100 bends along the length as compared to the electrical property of the filament 1100 in a nonbent condition. The filament 1100 is dimensioned to be of similar dimensions to conventional brush filaments, so as to be bodily incorporated with conventional brush filaments into a brush head. For example, the filament 1100 can have a width not more than 1 mm and length not more than 10 cm. In the capacitive brush filament 1100 of FIG. 11A, the electrical property being changed by the means 1106 is the induced current flow in the conductor 1102 through bending of the filament.

Particularly, the capacitive brush filament 1100 has a core conductor 1102 made of a material low in electrical resistivity (high in conductivity), such as copper or other metals. The core conductor 1102 is surrounded by annular electrical insulation layer 1104. The annular electrical insulation layer 1104 is compressible so as to compress when the filament 1100 bends. The means 1106 comprises a second conductor separated from the core conductor 1102 throughout the length of the core conductor 1102 by the electrical compressible insulation 1104. In one embodiment, the second conductor means 1106 is a coil wound helically on the exterior of the insulation layer 1104.

Generally, the capacitive brush filament 800 works according to the principle of capacitive coupling. An alternating current (AC) applied to the second conductor means 1106 induces a current in the core conductor 1102 that depends on the distance between the second conductor means 1106 and the core conductor 1102. While the filament 1100 is in a nonbent condition, the distance between the core conductor 1102 and the second conductor means 1106 is generally constant and determined by the thickness of the insulation layer 1104. During bending of the filament 1100, the core conductor 1102 will be brought in closer proximity to the second conductor means 1106 due to the inner bend of a curve being a shorter distance than the outer bend of the curve. See FIGS. 12A and 12B showing the inner side 1210 of the bend causing the core conductor 1102 to move closer to the second conductor means 1106 and the insulation 1104 yielding to allow the distance to close. The closer distance between the core conductor 1102 and the second conductor means 1106 in the bent filament 1100 will induce a different current flow in the core conductor 1102 through capacitive coupling as compared to the current flow when the filament 1100 is in the nonbent condition. A sensor, such as a capacitance meter (not shown), senses the current flow in the core conductor 1102 induced by the second conductor means 1106. The difference in the induced current flow in the core conductor 1102 of the filament 1100 in the bent condition compared to the nonbent condition is translated to represent a characteristic of bending of the filament 1100 that can be used to create a paint brush digital effect.

While the capacitive brush filament 1100 includes at least the three layers of the core conductor 1102, the insulation 1104, and the second conductor means 1106; however, the capacitive brush filament 1100 may also include additional layers surrounding the second conductor means 1106. An additional layer surrounding the means 1106 may include a further exterior insulation layer and/or a layer of material similar to all other brush filaments. For example, the exterior layer of the capacitive brush filament can be NYLON or POLYESTER, which are common materials for synthetic brush filaments.

Figures 13A, 13B:
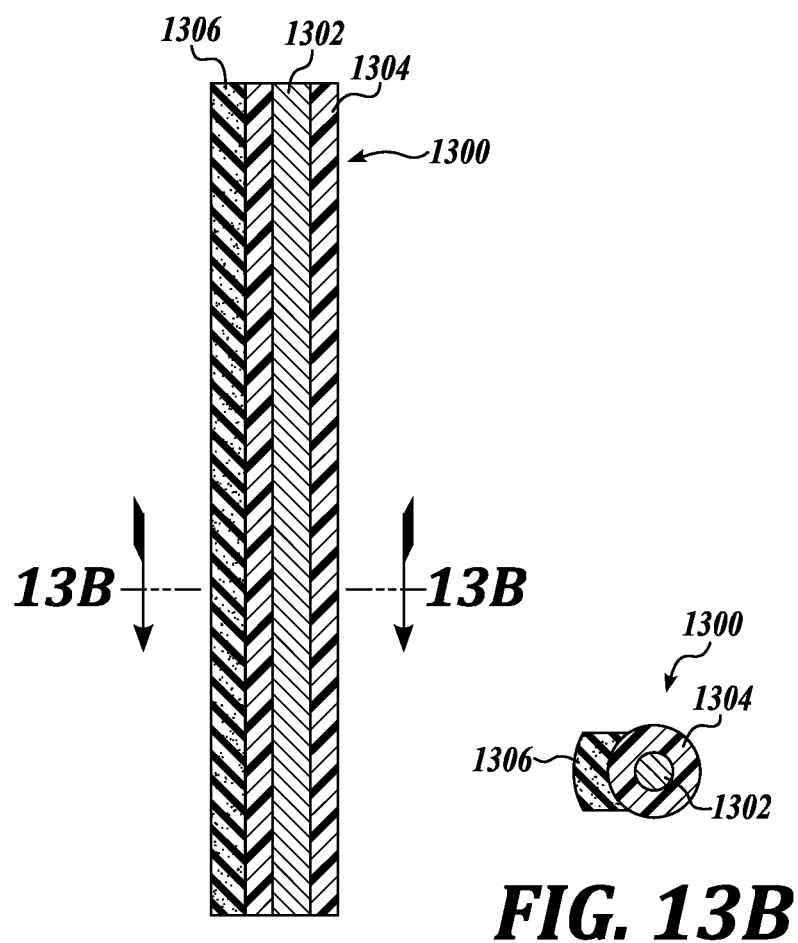
FIG. 13A is a diagrammatical illustration of an embodiment of a capacitive brush filament for sensing bending.
FIG. 13B is a cross-sectional illustration of the capacitive brush filament of FIG. 13A.

FIGS. 13A and 13B show a capacitive brush filament 1300 that has the second conductor means 1306 as a strip of material on one side (a segment of the circumference) along the length of the filament 1300 instead of the entire circumference as in the embodiment of FIGS. 11A and 11B. In the embodiment of FIGS. 13A and 13B, the capacitive brush filament 1300 can sense direction of bending by such placement of a strip of the second conductor means 1306 along the filament 1300 from the proximal end to the distal end. When assembling a brush head with filaments 1300 of FIGS. 13A and 13B, the filament 1300 will be oriented with a particular angular placement of the second conductor means 906 in the brush head to sense the direction desired to be sensed, for example.

The brush filament sensors 200, 400, 500, 800, 900, 1100, and 1300 of this disclosure can be used in stylus brushes of various brush heads with or without additional conventional brush filaments. A stylus brush, like a stylus pen, is a brush capable of use on any device with a digitizer. In an embodiment, the particular type of stylus brush can be similar to an artist's brush or a decorator's brush. Artist's brushes come in a variety of sizes and shapes. Names of the brushes describe the overall appearance of the brush head. Representative stylus brush types include, but are not limited to, round, flat, filbert, fan, angle, and mop. Decorator's brushes are mostly flat or angled.

FIGS. 14A and 14B illustrate an embodiment of a flat stylus brush 1400 incorporating one or more of the brush filament sensors disclosed herein. While a flat stylus brush 1400 is illustrated, the brush filament sensors of this disclosure are not limited for use with any particular brush head shape. The flat stylus brush of FIGS. 14A and 14B has all the filaments essentially of similar length providing a flat distal contact surface. A cross-sectional view through the brush head 1402 shows that the filaments are arranged into a shape that has a long cross-sectional dimension referred to herein as the length of brush head 1402 and a thin cross-sectional dimension referred to herein as the width of brush head 1402. The height of the brush head 1402 corresponds to the filament length. In an embodiment, one or a plurality of brush filament sensors 1404, 1406 of this disclosure can be placed at or toward the ends of the length of the brush head to sense the bend of the different areas of the stylus brush 1400. Brush filament sensors can also be placed in the middle of the length or continuously from one end of the length to the opposite end. By placing the brush filament sensors 1404 and 1406 at the ends of the length of the brush head 1402, the bending of the filaments can be sensed even when only one end of the brush head 1402 is used, such as when used at an angle, for example. The brush filament sensors 1404 and 1406 can be incorporated into the brush head 1402 in combination with conventional non-sensing filaments 1408.

FIGS. 15A and 15B illustrate an embodiment of a stylus brush 1500 with a round brush head 1502 incorporating one or more of the brush filament sensors disclosed herein. Referring to FIG. 15B, the cross-sectional shape of the round brush head 1502 shows the shape being generally circular with the length of the brush head 1502 generally equal to the width of the brush head 1502. However, the diameter of the brush head 1502 decreases according to the height of the brush head 1502 with the greater diameter being at the base and tapering toward the distal end of the brush head 1502. The round brush head 1502 of FIGS. 15A and 15B can have longer filaments in the center of the brush head 1502 with shorter filaments the further away from the center of the brush head 1502. In an embodiment, the brush of FIGS. 15A and 15B can represent a Sumi brush, for example. In an embodiment, one or a plurality of brush filament sensors 1504 are placed at or near the center of the brush head 1502 to sense the overall direction of bending of the brush head 1502. Brush filament sensors can also be placed in a circular row at different radiuses extending away from the center. The brush filament sensor(s) 1504 can be incorporated into the brush head 1502 in combination with conventional non-sensing filaments 1506.

Figure 16:
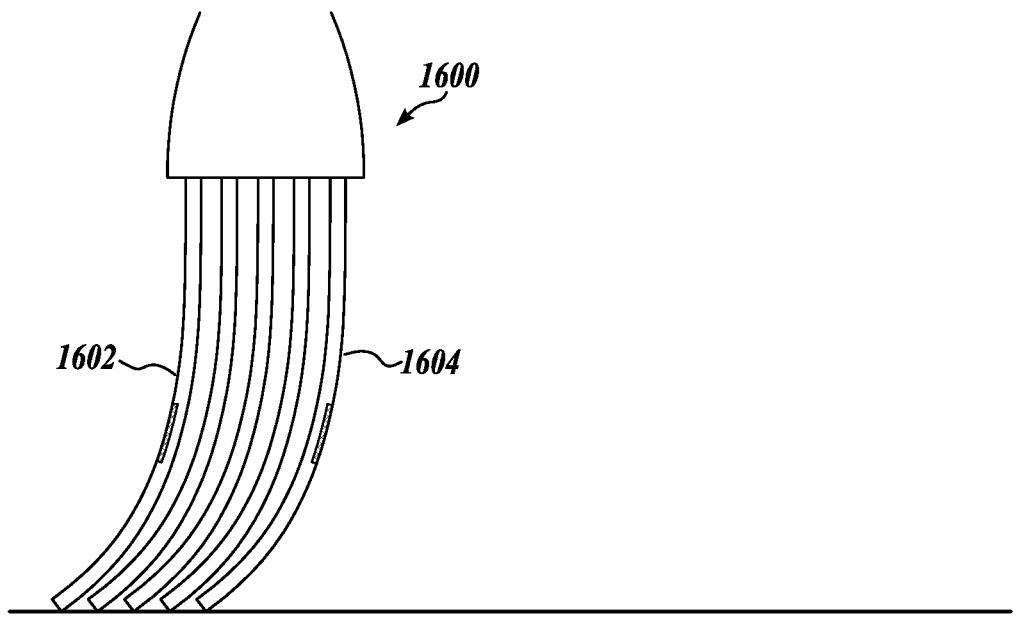
FIG. 16 is a diagrammatical illustration of a brush head showing the placement of directional brush filaments in a brush head.

As noted herein, some brush filament sensors of this disclosure are directional and can detect the direction the filaments are being bent more readily. Such directional filaments 200, 900, and 1300, for example, are placed in the brush heads at a particular angular placement depending on the direction desired to be sensed, and can detect direction of movement as well as direction of bend. FIG. 16, for example, shows a flat stylus brush head 1600 having directional filament sensors 1602, 1604 placed on opposite sides of the length of the brush head 1600. As shown in FIG. 16, the direction of bend is opposite to the direction of movement. The bending and direction information received from the directional brush filament sensors 1602 and 1604 can used for the creating the digital paint brush effects.

Figure 17:
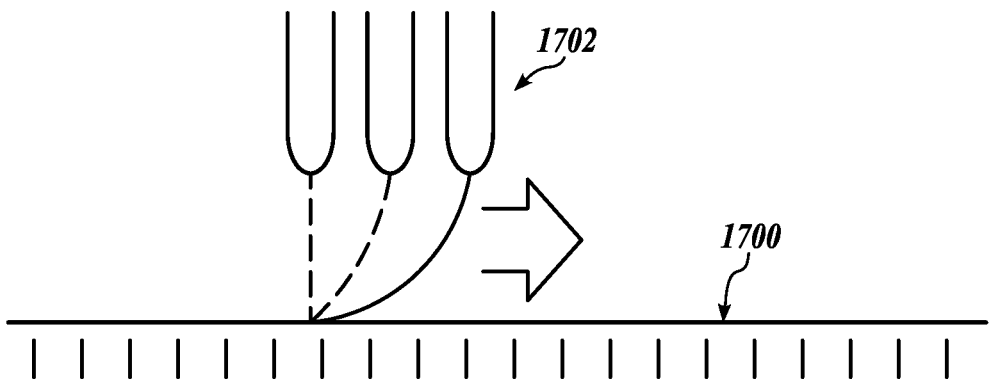
FIG. 17 is a diagrammatical illustration showing the use of the digitizer for sensing direction of bending.

Referring to FIG. 17, in an embodiment, movement direction can come from the change in digitizer coordinates 1700. Further, digitizer coordinate movement can also be used to detect bend direction, since bend direction is opposite to the brush head 1702 direction. However, in the absence of changing digitizer coordinates, the direction of movement can be inferred from the bend direction via the use of directional brush filament sensors as discussed previously.

Illustrative embodiments include the following.

In one embodiment, a filament 200, 400, 500, 800, 900, 1100, 1300 for a stylus brush, comprises: a transmission core 202, 402, 502, 802, 902, 1101, 1302 extending the length of the filament, wherein the transmission core transmits light or current along the length of the filament; a cladding or insulator 204, 404, 504, 804, 904, 1104, 1304 juxtaposed against the transmission core; and a means 206, 406, 506, 806, 906, 1106, 1306 for changing a light or electrical property passing through the transmission core when the filament bends along the length as compared to the light or electrical property of the filament in a nonbent condition, wherein the filament has a width not more than 1 mm and length not more than 10 cm.

In one embodiment, the transmission core 202, 402, 502 is an optical fiber having a conductor of light and the cladding or insulator 204, 404, 504 providing total internal reflection, wherein the means 206, 406, 506 comprises at least one area where the cladding or insulator is absent along the length of the filament which causes loss of reflection of light.

In one embodiment, the means 406 comprises cladding 404 being absent at a distal end of the filament 400.

In one embodiment, the means 506 comprises cladding 504 being absent between the proximal and distal ends of the filament 500.

In one embodiment, the means 206, 906, 1306 encompasses a segment less than the entire circumference of the filament 200, 900, 1300.

In one embodiment, the filament 800, 900 comprises an electrical circuit having a metal conductor 802, 902, wherein the means 806, 906 comprises a variable resistive conductive material separated from the metal conductor for a majority of the length of the filament by an electrical insulator 804, 904 except at a tip of the filament where the metal conductor contacts the variable resistive conductive material.

In one embodiment, the variable resistive conductive material 806 is provided around a circumference of the filament 800 and for a length of the filament.

In one embodiment, the variable resistive conductive material 906 is provided as a strip along a side of the filament 900.

In one embodiment, the transmission core 1102, 1302 is a metal conductor, wherein the means 1106, 1306 comprises a second conductor separated from the metal conductor for a length of the filament 1100, 1300 by an electrical insulator 1104, 1304, wherein the insulator has a degree of compression.

In one embodiment, the second conductor 1106 is a coil wound around the insulator 1104.

In one embodiment, the second conductor 1306 is provided as a strip along a side of the filament 1300.

In one embodiment, a stylus brush 100 for creating images on a workstation surface, comprises: a plurality of brush filaments arranged into a brush head at an end of the stylus brush, and at least one of the plurality of brush filaments is a filament sensor 200, 400, 500, 800, 900, 1100, 1300 comprising: a transmission core 202, 402, 502, 802, 902, 1101, 1302 extending the length of the filament, wherein the transmission core transmits light or current along the length of the filament; a cladding or insulator 204, 404, 504, 804, 904, 1104, 1304 juxtaposed against the transmission core; and a means 206, 406, 506, 806, 906, 1106, 1306 for changing a light or electrical property passing through the transmission core when the filament bends along the length as compared to the light or electrical property of the filament in a nonbent condition.

In one embodiment, the stylus brush comprises a flat brush head 1400, and at least two filament sensors 1404, 1406, wherein each of the filament sensors is placed at an end of the brush head length.

In one embodiment, the stylus brush comprises a round brush head 1500, and at least one filament sensor 1504 is placed at about the center of the brush head length and width.

In one embodiment, the stylus brush 1600 comprises one or more directional filament sensors 200, 900, 1300, 1602, 1604 placed at a particular angular placement depending on the direction desired to be sensed.

In one embodiment, the directional filament sensors comprise a means provided as a strip along a side of the filament.

In one embodiment, a method of sensing bending of filaments of a stylus brush, comprises: providing at least one filament sensor in a brush head 100, the filament 200, 400, 500, 800, 900, 1100, 1300 including: a transmission core 202, 402, 502, 802, 902, 1101, 1302 extending the length of the filament, wherein the transmission core transmits light or current along the length of the filament; a cladding or insulator 204, 404, 504, 804, 904, 1104, 1304 juxtaposed against the transmission core; and a means 206, 406, 506, 806, 906, 1106, 1306 for changing a light or electrical property passing through the transmission core when the filament bends along the length as compared to the light or electrical property of the filament in a nonbent condition, wherein the filament has a width not more than 1 mm and length not more than 10 cm.

In one embodiment, the transmission core 202, 402, 502 is an optical fiber having a conductor of light and the cladding 204, 404, 504 or insulator providing total internal reflection, wherein the means 206, 406, 506 comprises at least one area where the cladding or insulator is absent along the length of the filament 200, 400, 500 which causes loss of reflection of light, the method further comprising: sensing the bending of filaments of the stylus brush 100 based on the loss of reflection of light.

In one embodiment, the method further comprises: sensing the bending of filaments of the stylus based on a difference in light at the base of the filament and a tip of the filament.

In one embodiment, the transmission core 802, 902 is an metal conductor, the filament 800, 900 comprises an electrical circuit wherein the means 806, 906 comprises a variable resistive conductive material separated from the metal conductor for a majority of the length of the filament by an electrical insulator 804, 904 except at a tip of the filament where the metal conductor contacts the variable resistive conductive material, the method further comprising: sensing a difference in resistance across the electrical circuit when bending the filament compared to a resistance when the filament is in a nonbent condition.

In one embodiment, the transmission core 1100, 1300 is a metal conductor, wherein the means 1106, 1306 comprises a second conductor separated from the metal conductor for a length of the filament by an electrical insulator 1104, 1304, wherein the insulator has a degree of compression, the method further comprising: sensing a difference in the capacitance of when bending the filament compared to a capacitance when the filament is in a nonbent condition.

While illustrative embodiments have been illustrated and described, it will be appreciated that various changes can be made therein without departing from the spirit and scope of the invention.

The invention claimed is:

1. A filament for a stylus brush, comprising:
a transmission core extending the length of the filament, wherein the transmission core transmits light or current along the length of the filament;
a cladding or insulator juxtaposed against the transmission core; and
a means for changing a light property passing through the transmission core when the filament bends along the length as compared to the light property of the filament in a nonbent condition, wherein the transmission core is an optical fiber having a conductor of light and the cladding or insulator providing total internal reflection, wherein the means comprises at least one area where the cladding or insulator is absent along the length of the filament which causes loss of reflection of light.

2. The filament of claim 1, wherein the means comprises cladding being absent at a distal end of the filament.

3. The filament of claim 1, wherein the means comprises cladding being absent between the proximal and distal ends of the filament.

4. The filament of claim 1, wherein the means encompasses a segment less than the entire circumference of the filament.

5. A stylus brush for creating images on a workstation surface, comprising:
 a plurality of brush filaments arranged into a brush head at an end of the stylus brush, and
 at least one of the plurality of brush filaments is a filament sensor comprising:
  a transmission core extending the length of the filament, wherein the transmission core transmits light or current along the length of the filament;
  a cladding or insulator juxtaposed against the transmission core; and
  a means for changing a light property passing through the transmission core when the filament bends along the length as compared to the light property of the filament in a nonbent condition, wherein the transmission core is an optical fiber having a conductor of light and the cladding or insulator providing total internal reflection, wherein the means comprises at least one area where the cladding or insulator is absent along the length of the filament which causes loss of reflection of light.

6. The stylus brush of claim 5, comprising a flat brush head, and at least two filament sensors, wherein each of the filament sensors is placed at an end of the brush head length.

7. A method of sensing bending of filaments of a stylus brush, comprising:
 providing at least one filament sensor in a brush head, the filament including:
  a transmission core extending the length of the filament, wherein the transmission core transmits light or current along the length of the filament;
  a cladding or insulator juxtaposed against the transmission core; and
  a means for changing a light property passing through the transmission core when the filament bends along the length as compared to the light property of the filament in a nonbent condition,
  wherein the transmission core is an optical fiber having a conductor of light and the cladding or insulator providing total internal reflection, wherein the means comprises at least one area where the cladding or insulator is absent along the length of the filament which causes loss of reflection of light, and
 sensing the bending of filaments of the stylus brush based on the loss of reflection of light.

8. The method of claim 7, further comprising:
 sensing the bending of filaments of the stylus based on a difference in light at the base of the filament and a tip of the filament.

* * * * *